May 29, 1956      E. A. NEFF      2,747,891
TOWING DEVICE WITH ADJUSTABLE BUMPER CLAMPS
Filed Nov. 13, 1953
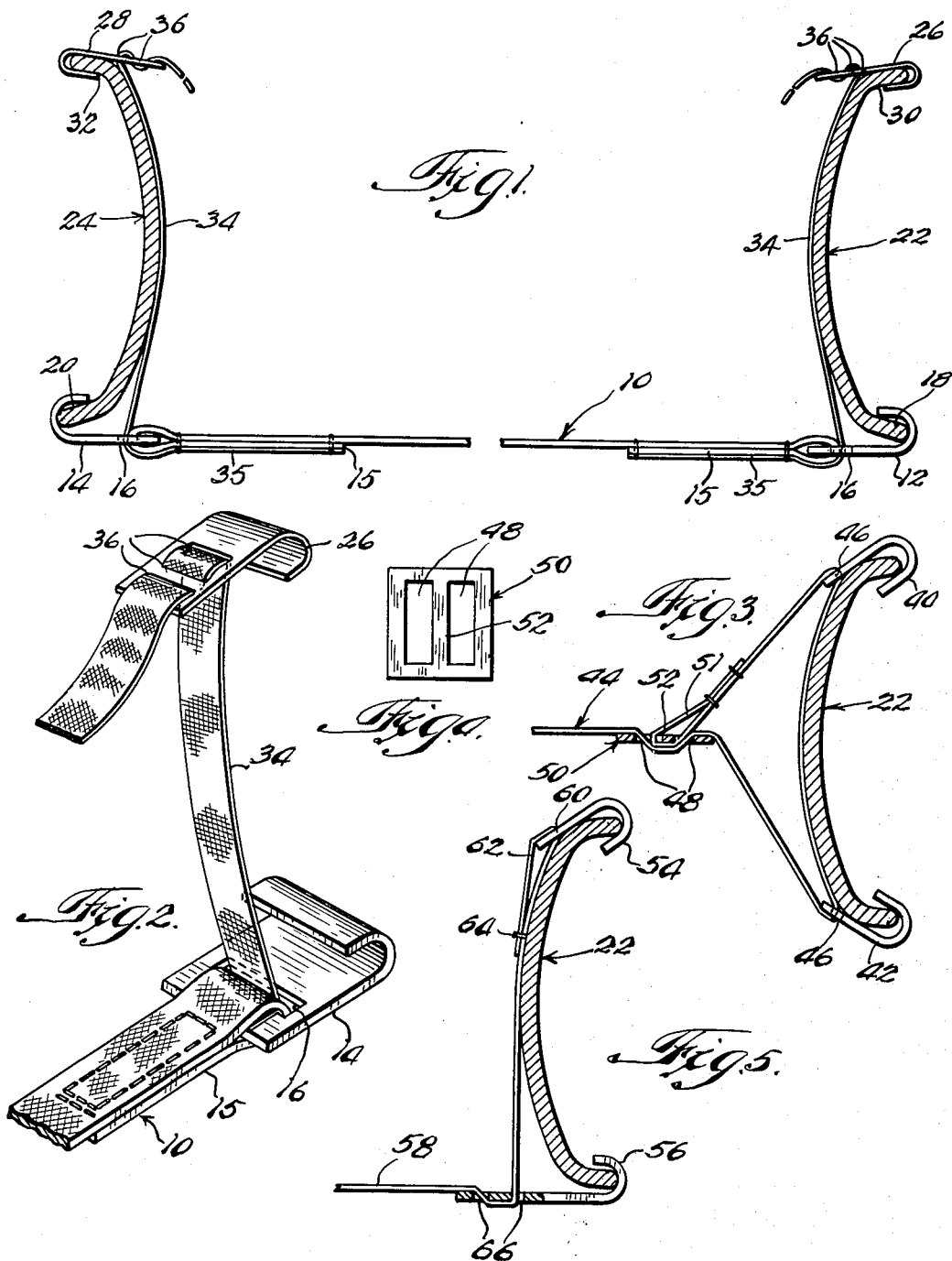
INVENTOR.
Edward A. Neff

United States Patent Office 2,747,891
Patented May 29, 1956

2,747,891

TOWING DEVICE WITH ADJUSTABLE BUMPER CLAMPS

Edward A. Neff, Chicago, Ill.

Application November 13, 1953, Serial No. 391,884

4 Claims. (Cl. 280—480)

This invention relates to towing devices and more particularly to those adapted to be used for coupling two vehicles together so that one may be towed by the other.

Towing devices, and more particularly those employed to tow one automobile by another automobile, are quite common but a difficulty frequently encountered in the use of many such devices is that either the construction thereof is such that they are difficult to engage and disengage from the respective vehicles or that the construction which facilitates engagement or disengagement also creates a tendency of the device to become accidentally disengaged when the towing tension is relaxed and a slack develops in the towing line.

It is an object of this invention, therefore, to provide a towing device constructed so as to facilitate engagement and disengagement of the towing device from the towing and towed vehicles and at the same time provide against accidental disengagement from the vehicles should a slack develop in the towing line.

It is a further object of this invention to provide such a device which is of simple and relatively inexpensive construction which may be readily attached and removed from operative engagement with a pair of vehicle bumpers.

It is a still further object of this invention to provide such a device which is light in weight, consists of a minimum number of parts, and which may be conveniently stored away when not in use.

According to one embodiment of this invention, there is provided a towing device for vehicles comprising a first pair of clamp members supported in spaced-apart relation on a flexible element, said first pair of clamp members having gripping portions each adapted to embrace one of the opposed lateral edge portions of a pair of vehicle bumpers, a second pair of clamp members each adapted to embrace the opposite lateral edge of said bumpers, elastic means connecting one member of said first pair and one member of said second pair in spaced-apart relationship, and means for adjusting said last-mentioned spaced-apart relationship.

According to another embodiment of this invention, the cooperating pairs of clamp members are both secured in adjustable spaced-apart relationship on the flexible tow line extending between the vehicles, the spaced-apart relationship being adjustable by means of a buckle member separate and apart from the clamp members.

According to a still further embodiment of this invention, the cooperating pairs of clamp members are both secured to the tow line but the spaced-apart relationship of the cooperating clamp members is adjusted by means of a buckle provided on the shank portion of one member of each cooperating pair of clamp members.

This invention, together with further objects and advantages thereof, will best be understood by reference to the following description taken in connection with the accompanying drawing, and its scope will be pointed out in the appended claims.

In the drawing, in which like parts are designated by like reference numerals:

Figure 1 is a side elevational view of one embodiment of the invention partially broken away to show the device in operational engagement with a pair of vehicle bumpers shown in section;

Fig. 2 is a perspective view of certain portions of the device shown in Fig. 1;

Fig. 3 is a side elevational view in section of certain portions of a modified form of the device shown in operative engagement with a vehicle bumper;

Fig. 4 is a plan view of one element of the device shown in Fig. 3; and

Fig. 5 is a side elevational view in section of certain portions of another modified form of the device shown in operative engagement with a vehicle bumper.

As shown in Figs. 1 and 2, one embodiment of the invention comprises a flat textile tow line 10, which may be made of nylon, having a pair of clamp members 12 and 14 secured at each end thereof by inserting the ends of the tow line through slots 16 provided in the shank portions of the clamp members 12 and 14 and bending the ends 15 of the tow line back upon themselves to form loops secured by stitching, as shown in Fig. 2. The gripping portions of clamp members 12 and 14 are substantially J-shaped so as to embrace the lower lateral edges 18 and 20 of vehicle bumpers 22 and 24, respectively. The tensile strength of tow line 10 and clamps 12 and 14 is such that they may withstand substantially the entire strain during the towing operation.

In order to prevent the clamps 12 and 14 from becoming accidentally disengaged from the vehicle bumpers should any slack develop in the tow line when the towing strain is relaxed during towing, a second pair of clamp members 26 and 28 are provided. The gripping portions of clamp members 26 and 28 are also substantially J-shaped so as to embrace the upper lateral edges 30 and 32, respectively, of the vehicle bumper. Clamp members 26 and 28 are secured to the towing device in adjustable spaced-apart relationship to the lower clamp members 12 and 14, respectively, by a pair of elastic straps 34, the lower ends 35 of which are received through slots 16 in the lower clamp members 12 and 14 and are also secured to the tow line 10 by stitching, as shown in Fig. 2. As shown best in Fig. 2, the upper ends of each elastic strap 34 are secured to the upper clamp members by means of insertion through three spaced-apart slots 36 which form buckles in the shank portions of the upper clamp members.

Prior to engagement of the upper clamp members 26 and 28 with the upper lateral edges 30 and 32, respectively, of the vehicle bumpers, the positions of the upper clamp members may be adjusted on the elastic members 34 so that when the upper clamp members are placed in engagement with the bumpers, a sufficient strain will be put on the elastic members to hold the lower clamp members 12 and 14 in engagement with the lower lateral edges 18 and 20 of the bumpers even when there is a slack in the towing line 10.

Since no towing strain is placed upon either the elastic members or the upper clamp members 26 and 28, these elements of the device need not have as great a tensile strength as the tow line and lower clamp members 18 and 20. Thus, the upper clamp members and elastic member 34 need only be strong enough to support the weight of the tow line and lower clamp members. A further advantage of this construction is that the lower clamp members will be disposed with their shank portions horizontal even when there is a slack in the tow line.

A modified form of this invention is shown in Figs. 3 and 4 wherein the upper and lower clamp members 40 and 42 are both supported on the tow line 44 which is received through slots 46 provided in the shank portions of the clamp members. In this embodiment, tow line 44 is threaded through a pair of slots 48 provided on a separate buckle member 50 and the looped ends 51 of the tow line embrace the central portion 52 of the buckle member 50. As shown in Fig. 3, the loop 51 is formed by folding the end of the tow line back upon itself and securing the loop by stitching. A similar loop is formed at the opposite end of the tow line. In placing this embodiment of the invention in operative engagement with the vehicle bumper, the clamps 40 and 42 are first placed in engagement with the upper and lower lateral edges of the bumper and then secured in engaged position by adjustment of the buckle member 50 on the tow line. In this embodiment it will be noted that the construction and strength of the upper and lower clamp members 40 and 42 are substantially the same since both clamp members will be subjected to a large part of the towing strain during the towing operation.

A still further embodiment of the invention is shown in Fig. 5 wherein both upper and lower clamp members 54 and 56 are secured in spaced-apart relation on the towing line 58. In this embodiment the end of the tow line is inserted through a slot 60 provided in the shank portion of the upper clamp member 54 and bent back upon itself to form a loop 62 therein secured by stitching 64. The lower clamp member 56 is provided with a pair of slots 66 provided in the shank portion thereof to form a buckle through which the tow line is threaded and by means of which the upper and lower clamp members are secured in adjustable spaced-apart relation. In this embodiment of the invention, as in the embodiment disclosed in Fig. 1, the upper clamp member need not have as great a tensile strength as the lower clamp member since a large part of the towing strain during the towing operation will be taken by the lower clamp member. In this embodiment also, the clamps will not become detached from the vehicle if the tow line is slack because of the resistance to slipping of the tow line through apertures 66 of clamp 56.

While several embodiments of this invention have been shown, it will be understood, of course, that the invention is not to be limited thereto, since many modifications may be made, and it is contemplated, therefore, by the appended claims, to cover any such modifications as fall within the true spirit and scope of this invention.

The invention having thus been described, what is claimed and desired to be secured by Letters Patent is:

1. A towing device including a flexible tow line for vehicles comprising a pair of clamp members having gripping portions adapted to embrace the opposed lateral edge portions of a vehicle bumper, a first member of said pair being secured to one end of said tow line, an elastic member having one end secured to the same end of said tow line, the second member of said pair of clamp members being secured to the other end of said elastic member in spaced-apart relation to said first clamp member, and said elastic member being stretchable to permit said clamp members to embrace said bumper and to prevent said clamp members from disengaging from said bumper when the tension on said tow line is relaxed.

2. A towing device including a flexible tow line for vehicles comprising a pair of clamp members having gripping portions adapted to embrace the opposed lateral edge portions of a vehicle bumper, a first member of said pair being secured to one end of said tow line, an elastic member having one end secured to the same end of said tow line, the second member of said pair of clamp members being secured to the other end of said elastic member in spaced-apart relation to said first clamp member, said spaced-apart distance being less than the distance between said opposed lateral edge portions when said elastic member is in unstretched condition, said elastic member being stretchable to permit said clamp members to embrace said bumper and to prevent said clamp members from disengaging from said bumper when the tension on said tow line is relaxed, and said second clamp member comprising means for adjusting the spaced-apart distance between said clamp members.

3. A towing device including a flexible tow line for vehicles comprising a pair of clamp members having gripping portions adapted to embrace the opposed lateral edge portions of a vehicle bumper, a first member of said pair being secured to one end of said tow line and having sufficient tensile strength to withstand substantially the entire towing strain, an elastic member having one end secured to the same end of said tow line, the second member of said pair of clamp members being secured to the other end of said elastic member in spaced-apart relation to said first clamp member, said spaced-apart distance being less than the distance between said opposed lateral edge portions when said elastic member is in unstretched condition, said elastic member being stretchable to permit said clamp members to embrace said bumper and to prevent said clamp members from disengaging from said bumper when the tension on said tow line is relaxed, and said second clamp member comprising means for adjusting the spaced-apart distance between said clamp members.

4. A towing device including a flexible tow line for vehicles comprising a pair of clamp members having gripping portions adapted to embrace the opposed lateral edge portions of a vehicle bumper, a first member of said pair being secured to one end of said tow line and having sufficient tensile strength to withstand substantially the entire towing strain, an elastic member having one end secured to the same end of said tow line, the second member of said pair of clamp members being secured to the other end of said elastic member in spaced-apart relation to said first clamp member, said spaced-apart distance being less than the distance between said opposed lateral edge portions when said elastic member is in unstretched condition, said elastic member being stretchable to permit said clamp members to embrace said bumper and to prevent said clamp members from disengaging from said bumper when the tension on said tow line is relaxed, and buckle means on said second clamp member for adjusting the spaced-apart distance between said clamp members.

References Cited in the file of this patent
UNITED STATES PATENTS

| | | |
|---|---|---|
| 1,483,253 | Tabler | Feb. 12, 1924 |
| 2,435,813 | Williams | Feb. 10, 1948 |
| 2,494,526 | Tungett et al. | Jan. 10, 1950 |
| 2,555,430 | Weeks | June 5, 1951 |
| 2,708,121 | May | May 10, 1955 |